Nov. 10, 1936.  E. P. MULLAN  2,060,105
PROCESS FOR THE PRODUCTION OF POSITIVES AND NEGATIVES WITHOUT
THE USE OF PHOTOGRAPHY OR PHOTOGRAPHIC APPARATUS
Filed Sept. 29, 1932
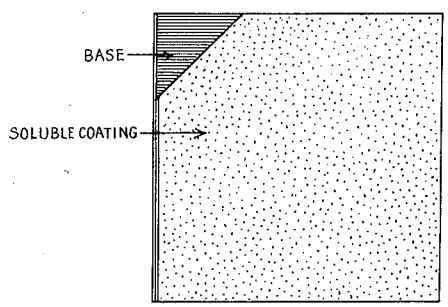
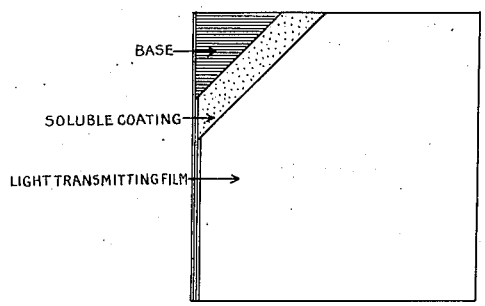
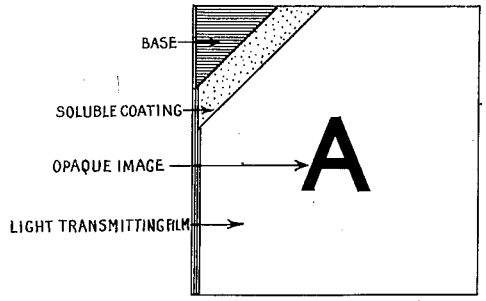
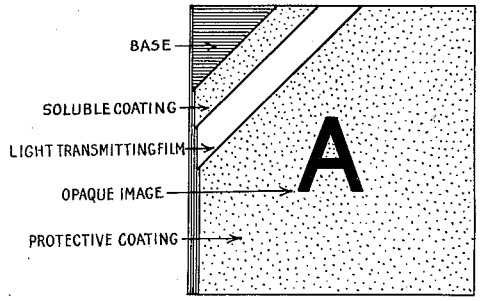
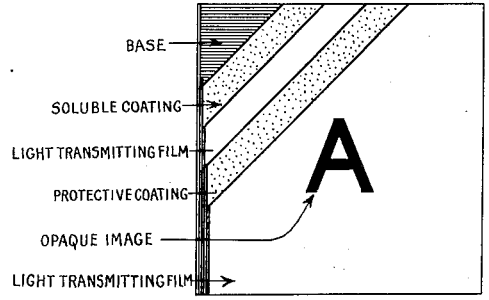
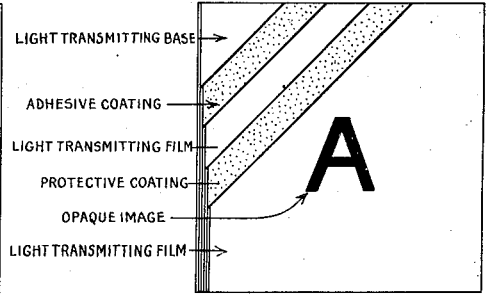
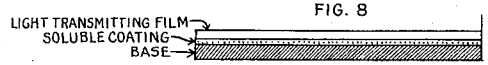
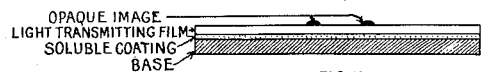
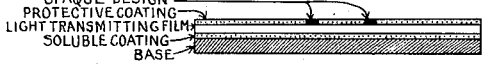
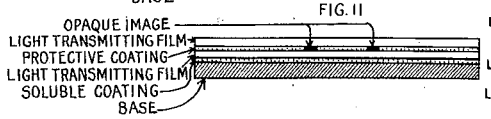
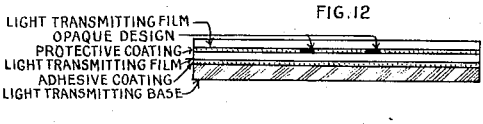
INVENTOR
Edward P. Mullan
By W. W. Williamson
Atty.

Patented Nov. 10, 1936

2,060,105

UNITED STATES PATENT OFFICE 2,060,105

PROCESS FOR THE PRODUCTION OF POSITIVES AND NEGATIVES WITHOUT THE USE OF PHOTOGRAPHY OR PHOTOGRAPHIC APPARATUS

Edward P. Mullan, Bala, Pa.

Application September 29, 1932, Serial No. 635,307

3 Claims. (Cl. 41—46)

My invention relates to a new and useful process for the production of positives and negatives without the use of photography or photographic apparatus and has for its object the forming of an ink-receptive light-transmitting film mounted upon a suitable temporary base coated with a soluble material, the production of an opaque design upon the ink-receptive light-transmitting film, the provision of a light-transmitting protective coating to prevent destruction of the light-transmitting film and its superimposed opaque design, the forming of a second light-transmitting film over the protective coating to strengthen and give body to the first light-transmitting film so as to permit the removal of the positive thus formed from the temporary base by the destruction of the soluble coating, the provision of a method of reversing so that the design can be made to read forwards or backwards as desired, and the mounting of the positive upon a suitable light-transmitting base.

Finally, my object is to utilize the steps of a process which are relatively simple and which may be carried out in any shop without employing skilled photographers or photographic apparatus of any kind, and which will reproduce former work accurately to the minutest detail so that the finished printed product is equal to the highest grade work of this kind.

In the drawing accompanying the specifications, the first method of producing a design upon a light-transmitting film is shown in Figs. 1 to 12 inclusive. Following is a clear description of the steps illustrated.

Fig. 1 is a view of a sheet of material or temporary base having one surface covered with a soluble coating and constituting the first step of the comprehensive process, one corner of the base being left uncovered for illustrative purposes.

Fig. 2 is a view showing the second step wherein an ink-receptive light-transmitting film is formed upon the soluble coating.

Fig. 3 is a view illustrating the third step of the process wherein an opaque design is shown produced from a printing form upon the ink-receptive, light-transmitting film.

Fig. 4 is a view illustrating the fourth step during which the light-transmitting protective coating is formed over the design and the light transmitting film.

Fig. 5 is a view illustrating the fifth step at which time a second light-transmitting film is formed which second light-transmitting film covers the protective coating and serves to strengthen the first formed light-transmitting film to permit handling of the article during subsequent removal from the temporary base.

Fig. 6 is a view showing the sixth step of the process at which time the temporary base is removed from the completed positive and which is accomplished by the destruction of the soluble coating between the temporary base and contiguous element of the positive, and if desired, a permanent light-transmitting base substituted.

Figs. 7 to 12 inclusive, are slightly exaggerated cross sections of Figs. 1 to 6 inclusive, respectively.

In the first method a soft paper or other suitable base is coated with a syrupy solution made by dissolving dextrine in hot water. When the coating is thoroughly dry, it is flowed with a solution composed of 96 grains of pyroxylin dissolved in 8 ounces of ether and 8 ounces of alcohol to form a light-transmitting film.

When the light-transmitting film is dry, the base, the dextrine coating and the light-transmitting film are softened by allowing them to lie for a few moments between dampened blotters or paper. When the light-transmitting film becomes suitably moist, a print or image is produced in ink from a printing form upon the light transmitting film. The print may be positive or negative. The base, the dextrine coating, and the light-transmitting film are now allowed to become thoroughly dry and the print or image is dusted with finely ground lamp black and the non-adherent powder is removed by gently rubbing with a wad of absorbent cotton. The opaque print or image and the light-transmitting film are now flowed or sprayed with a solution of gum arabic dissolved in water. The positive or negative thus formed may be made to transmit more light by applying an oil to the base, and the positive or negative used in this form. Paraffine oil will answer the purpose, or another light-transmitting film may be formed upon the gum arabic coating by flowing with a solution composed by dissolving 96 grains of pyroxylin in eight ounces of ether and eight ounces of alcohol to which has been added 2 CC of castor oil. If the base is composed of a material which cannot be made to transmit light, the light-transmitting film may be removed from the base by immersing in water for a few minutes. This immersion dissolves the dextrine coating and the film becomes separated from the base and may be mounted upon a sheet of celluloid or other suitable light-transmitting support.

It is not always necessary to apply moisture to secure a suitable print upon the light-transmitting film formed upon the dextrine coating as described. In some cases the impression may be secured immediately after the light-transmitting film is formed and before it is allowed to dry.

If the base used is composed of a material that transmits sufficient light or if the base is composed of a material that can be made to transmit enough light, the dextrine coating may be omitted.

An image produced from a printing form may be positive or negative, for instance, if an intaglio engraving be inked only on the surface the resulting print would be negative, but if the incised lines of an intaglio engraving be inked and the surface kept clean the resulting print would be positive.

I claim:—

1. A process for the production of positives and negatives without the use of photography or photographic apparatus consisting of incorporating a light resisting impression from a printing form into a laminated film consisting of two extremely fragile films of a nitro-cellulose material, and a protective coating of gum arabic mounted upon a light transmitting nitrocellulose base.

2. A process for the production of positives and negatives without the use of photography or photographic apparatus consisting of incorporating an intensified opaque impression from a printing form in a laminated film consisting of two fragile films formed of pyroxylin separated by a film of gum arabic and mounted upon a heavier light transmitting base.

3. A process for the production of positives and negatives without the use of photography or photographic apparatus consisting of incorporating an intensified positive impression from a printing form into a laminated structure consisting of a film of collodion a coating of gum arabic a coat of collodion an adhesive coating and a light transmitting support.

EDWARD P. MULLAN.